Patented Oct. 13, 1936

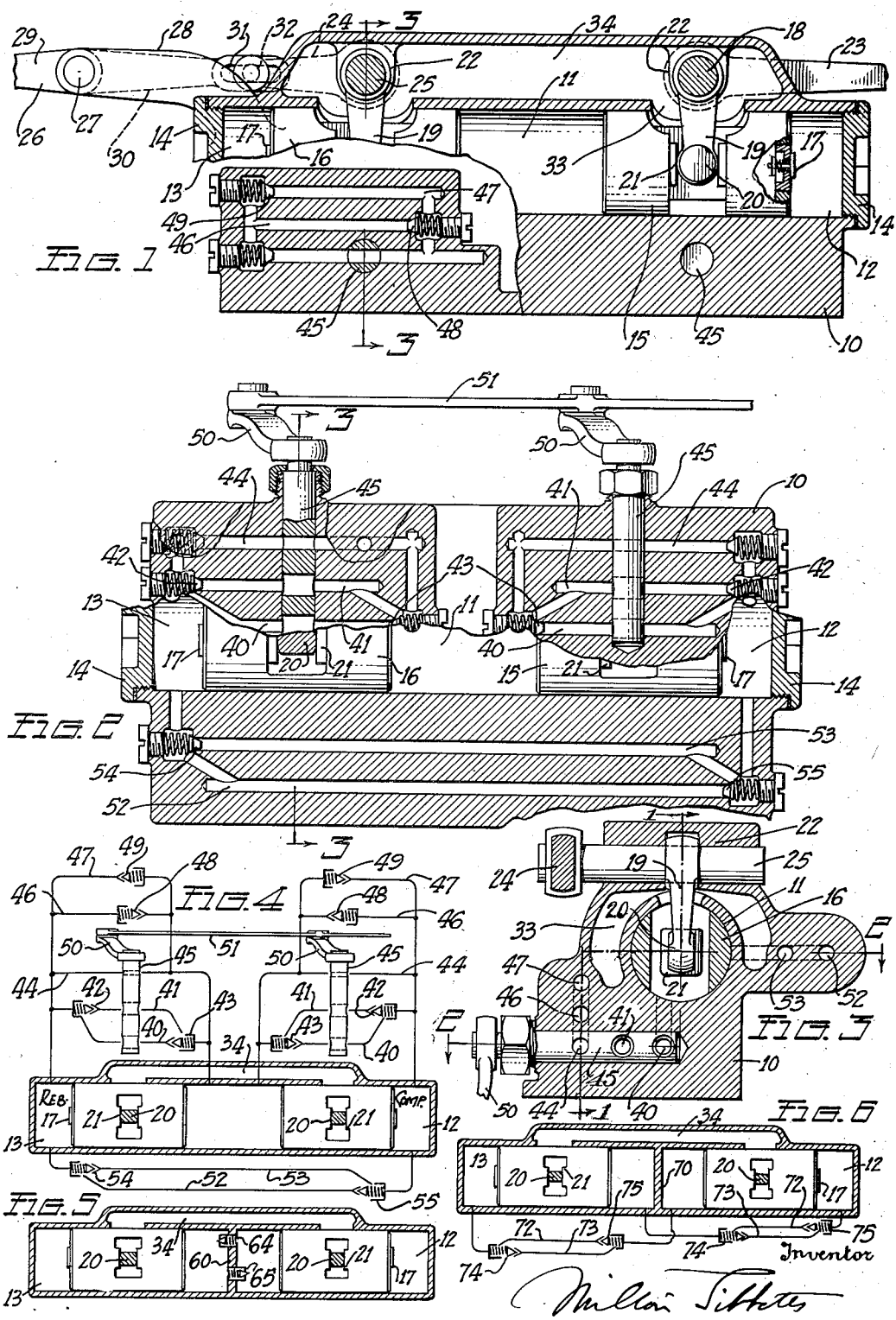

2,057,120

UNITED STATES PATENT OFFICE 2,057,120

SHOCK ABSORBER

Milton Tibbetts, Detroit, Mich., assignor to Packard Motor Car Company, Detroit, Mich., a corporation of Michigan Application March 1, 1934, Serial No. 713,490

11 Claims. (Cl. 188—88)

This invention relates to motor vehicles and particularly to shock absorber means therefor.

One of the objects of the invention is to provide a simple and compact shock absorber means which will be self-contained and cheap to manufacture.

Another object of the invention is to provide a duplex shock absorber of the double-acting type with cylinders aligned so that the cylinders of both shock absorbers can be machined at the same time.

Another object of the invention is to provide direct acting interconnections between two shock absorbers.

Other objects of the invention will appear from the following description taken in connection with the drawing, which forms a part of this specification, and in which:

Fig. 1 is a vertical section on the line 1—1 of Fig. 3 and illustrates a shock absorber means made in accordance with this invention;

Fig. 2 is a sectional view substantially on the line 2—2 of Fig. 3;

Fig. 3 is a cross section on the line 3—3 of Figs. 1 and 2;

Fig. 4 is a diagrammatic view showing the various passages and valves;

Fig. 5 is a longitudinal sectional view showing another form of the invention, and Fig. 6 is a view similar to Fig. 5 showing still another form.

Referring to the drawing, 10 represents a casing which as shown in the drawing is formed over a single casting with a through-bore 11 extending longitudinally from one end to the other thereof. This bore constitutes the two cylinders of a duplex shock absorber with the adjacent ends of the cylinders interconnected by a portion of the bore itself. For convenience the right hand cylinder in Fig. 1 will be numbered 12 and the left hand cylinder 13. The outer ends of this bore and consequently the outer ends of the cylinders are closed by suitable caps 14.

Arranged to operate in the cylinders 12 and 13 are double-acting pistons 15 and 16 respectively and each of these pistons has a check valve 17 in its outer end, the valve opening outwardly for the purpose of replenishing fluid in the system. The bore between the pistons is unobstructed so that when the cylinders are full of a suitable fluid the movement of one piston towards the other will tend to cause the other to move in the same direction.

Each of the pistons is provided with operating means, that at the right in Fig. 1 being a direct operating means and that at the left being connected through a reversing device. The right hand means comprises a bell crank lever 18, the arm 19 of which extends down into the piston 15 with its head 20 against suitable wear plates 21. The lever is mounted in a suitable bearing 22 in the casting 10 and a portion of it extends outside of the casting and is formed with the arm 23 of the lever. This arm 23 extends horizontally in the direction of the bore 11 and the casting end is adapted for connection to a relatively movable part of the vehicle, usually the vehicle axle or wheel carrier.

The other piston operating means comprises a bell crank lever 25 having a downwardly extending arm 19 similar to the arm for the other piston, and connected to operate its piston 16 in the same manner. There is also a bearing 22 for this bell crank lever and there is an arm 24 extending horizontally towards the left in Fig. 1 and in the opposite direction from that of the arm 23. A lever 26 is pivoted at 27 on a bracket 28 mounted upon or formed as an integral part of the casting 10 and extending outwardly therefrom. The outer end 29 of the lever 26 extends horizontally in a direction opposite to that of the arm 23 and is adapted for connection to the axle or wheel carrier at the opposite side of the vehicle. The inner end 30 of the lever 26 is formed with a slot 31 and the outer end of the arm 24 is formed with a pin 32 operating in the slot 31. This constitutes a reversing mechanism so that as the end 29 of the lever 26 moves upwardly the arm 24 of the lever 25 will be caused to move downwardly, and vice versa.

With the levers and reversing mechanism above referred to it will be seen that as the arms 23 and 29 are moved upwardly on what may be called the "compression" stroke, by the action of the wheel carriers, both the pistons 15 and 16 will be caused to move to the right. On the reverse or rebound stroke the pistons will both be moved to the left.

It will be understood that the entire casing will be filled with a suitable fluid and the space inside the pistons and surrounding the bearings 22, indicated at 33, may be used as a replenishing reservoir, and these reservoirs at the ends of the casting may be connected by a suitable passage 34 as shown in Fig. 1. Fluid leaking past the cylinders into the reservoir will be drawn back into the cylinders by the valves 17, as indicated above.

The arrangement of controlling passages for this hydraulic shock absorber means is particularly well shown in the diagrammatic view, Fig. 4. The right hand end of the cylinder is indicated as the compression end and the left hand end as the rebound end. The space between the pistons is neutral, in this form of the device.

There are passages 40, 41 between the outer ends of each cylinder and the space between the pistons, and these passages are controlled by oppositely closing valves 42 and 43. Then there is another and preferably smaller by-pass or passage 44 extending between the same points. This latter is shown as controlled by a hand or automatically operated valve 45, which valve may also entirely close off the passages 40 and 41 but when this is done there is a safety valve or blow-off arrangement in the form of passages 46 and 47 and the valves 48 and 49, these latter passages and valves extending around the cut-off valve 45. The latter may be operated through suitable arms 50 and connecting rod 51.

In addition to the above passages there are passages 52 and 53 with valves 54 and 55, these passages and valves connecting the outer ends of the cylinders 12 and 13, thus providing a by-pass around both pistons.

From the above description of the shock absorber means it will be seen that if both arms 23, 29 move upwardly at the same time, as would be the case if the wheels on both sides struck substantially the same bump, both pistons 15, 16 would move to the right and there would be a transfer of fluid from the compression end 12 of the bore to the rebound end 13 thereof. This fluid would take one of two courses, it would either pass through the passage 40 and valve 43 to the space between the pistons and thence through the passage 41 and valve 42 to the rebound end of the left hand cylinder, or it would pass through the passage 53 and valve 54, depending upon how the various valves were set. Preferably the valves 42 and 43 would be set a little lighter than the valves 54 and 55 so that most of the transfer would be through the passages 40 and 41 because those passages are controlled by the hand or automatically operated device. With the cut-off valve 45 entirely closing all of the passages 40, 41, and 44, the valves 54 and 55 would operated as blow-off valves along with the valves 48 and 49. These various valves would be set at the points giving the most desirable result. It will also be seen that when the reverse operation takes place, that is when both arms 23 and 29 move downwardly simultaneously both pistons will move from right to left as shown in Fig. 1, and this will cause a transfer of fluid from the rebound end 13 to the compression end 12 of the cylinder. Likewise this fluid would take one of two courses, either passing around the piston 16 through the passage 40 and the valve 43 to the space between the pistons, thence around the piston 15 through the passage 41 and the valve 42 to the compression end of the cylinder, or this fluid might pass from the rebound end 13 through the passage 52 and the valve 55 to the compression end 12 of the cylinder.

In Fig. 5 the cylinders 12 and 13 are separated by a partition 60 with valves 64, 65 controlling passages between the cylinders. These valves 64, 65 would correspond to the valves 54 and 55 of the construction shown in Fig. 4. The operation is similar to that of the other construction.

In Fig. 6 there is a solid partition 70 between the cylinders 12 and 13 and there are passages 72 and 73 and valves 74 and 75 connecting from the outer end of each cylinder to the inner end of the opposite cylinder. With this partition and this arrangement of passages the reversing device 31, 32 may or may not be used, as desired. These passages 72 and 73 and their valves 74 and 75 take the place of the passages 52 and 53 and their valves 54 and 55, shown in the preferred embodiment of the invention.

It will be understood that the modifications shown in Figs. 5 and 6 may be provided with various valved passages and connections illustrated in Figs. 1 to 3, but as Figs. 5 and 6 are only intended to illustrate modified features, the latter views do not include valved passages shown in Figs. 1 to 3.

It will be understood that various forms of the invention other than those described above may be used without departing from the spirit or scope of the invention.

What I claim and desire to secure by Letters Patent is:

1. Shock absorber means comprising axially aligned cylinders having a partition therebetween, a double-acting piston in each cylinder, connections for operating said pistons, said pistons being independently movable, and a pair of one-way valved passage means between said cylinders, the flow through said passage means being in opposite directions relatively.

2. Shock absorber means comprising axially aligned cylinders having a partition therebetween, a double-acting piston in each cylinder, connections for operating said pistons, said pistons being independently movable, and valved passage means through said partition.

3. Shock absorber means comprising axially aligned cylinders having a partition therebetween, a double-acting piston in each cylinder, connections for operating said pistons, said pistons being independently movable, and one-way valved passage means interconnecting the compression side of each cylinder with the rebound side of the other cylinder.

4. A hydraulic shock absorber comprising a cylinder long enough for two pistons, two double-acting pistons in said cylinder, the cylinder being closed at its outer ends and unobstructed between the pistons, means for operating the pistons, and a closed system for a liquid operating medium comprising liquid passage means around the pistons through which fluid can flow from either end directly to the opposite end of the cylinder.

5. A hydraulic shock absorber comprising a cylinder long enough for two pistons, two double-acting hollow pistons in said cylinder each having an opening through its head, a one-way valve associated with the opening in each piston head and opening outwardly thereof, the cylinder being closed at its outer ends and unobstructed between the pistons, means for operating the pistons, and a closed system for a liquid operating medium comprising valve controlled liquid passage means around each piston from its outer ends to the space between the pistons.

6. A shock absorber comprising a cylinder long enough for two pistons, two pistons operating in said cylinder with an interconnecting space between their adjacent ends, valved passage means around the pistons from the outer ends of the cylinder to the space between the pistons and valved passage means from one of the outer ends of the cylinder to the other outer end thereof.

7. A shock absorber means comprising two co-operating pistons, means directly connected to operate one of said pistons and means to operate the other of said pistons comprising a reversing device.

8. In shock absorber means, the combination of axially aligned shock absorber cylinders, a double-acting piston in each cylinder, said pistons being independently movable, and connections to said pistons such that the pistons move in the same direction when said connections move in the same direction.

9. In shock absorber means, the combination of axially aligned shock absorber cylinders, a double-acting piston in each cylinder, said pistons being independently movable, and connections to said pistons such that the pistons move in the same direction when said connections move in the same direction, said cylinders being hydraulically interconnected.

10. A hydraulic shock absorber comprising two double-acting piston-and-cylinder shock absorbers connected end-to-end, said pistons being independently movable, interconnections between adjacent ends of the cylinders, and means for operating the pistons such that as the operated parts of said means move together said pistons will move in the same direction.

11. A hydraulic shock absorber comprising two double-acting piston-and-cylinder shock absorbers connected end-to-end, interconnections between adjacent ends of the cylinders, and separate means for operating said pistons, one of said means connected directly to its piston and the other of said means connected through a reversing device, for the purpose specified.

MILTON TIBBETTS.